(12) United States Patent
Tang

(10) Patent No.: US 7,708,220 B1
(45) Date of Patent: May 4, 2010

(54) ELECTRIC DUAL CONDIMENT GRINDER

(75) Inventor: Wing Sum Tang, Hong Kong (HK)

(73) Assignee: Samson Bright Industrial Company Limited, Hong Kong (CN)

( * ) Notice: Subject to any disclaimer, the term of this patent is extended or adjusted under 35 U.S.C. 154(b) by 0 days.

(21) Appl. No.: 12/316,895

(22) Filed: Dec. 16, 2008

(51) Int. Cl.
*A47J 42/44* (2006.01)

(52) U.S. Cl. .................. 241/169.1; 241/258

(58) Field of Classification Search ......... 241/168, 241/169.1, 258
See application file for complete search history.

(56) References Cited

U.S. PATENT DOCUMENTS

| | | | |
|---|---|---|---|
| 5,088,652 | A | 2/1992 | Chen |
| 6,962,302 | B2 * | 11/2005 | Cheng ............... 241/169.1 |
| 7,234,658 | B2 * | 6/2007 | Lee ................. 241/169.1 |
| 7,380,737 | B2 * | 6/2008 | Wang ............... 241/169.1 |
| 7,604,189 | B2 * | 10/2009 | Wang ............... 241/169.1 |
| 2002/0130208 | A1 * | 9/2002 | Pedersen ........... 241/169.1 |
| 2003/0052207 | A1 * | 3/2003 | Wu ................. 241/169.1 |
| 2006/0261198 | A1 * | 11/2006 | Lee ................. 241/169.1 |
| 2007/0221769 | A1 * | 9/2007 | Wang ............... 241/169.1 |
| 2007/0221771 | A1 * | 9/2007 | Wang ............... 241/169.1 |

FOREIGN PATENT DOCUMENTS

| | | |
|---|---|---|
| BE | 1 004 510 A | 12/1992 |
| EP | 0 278 234 A1 | 8/1988 |
| EP | 1 839 545 A1 | 10/2007 |
| GB | 2 183 173 A | 6/1987 |
| WO | WO 2008/109074 A1 | 9/2008 |

OTHER PUBLICATIONS

Patents Act 1977: Combined Search and Examination Report under Sections 17 and 18(3) for United Kingdom Counterpart Application No. GB 0820716.9, 6 pgs. (Feb. 16, 2009).

* cited by examiner

*Primary Examiner*—Faye Francis
(74) *Attorney, Agent, or Firm*—Blakely, Sokoloff, Taylor & Zafman LLP

(57) ABSTRACT

A cordless electric dual condiment grinder includes a hollow housing elongated to extend between a base for supporting the grinder uprightly and an opposing top, the top of the housing having a bulbous form to define two condiment reservoirs (e.g. for receiving salt and pepper respectively). A unidirectional rotary grinding mechanism is disposed in a lateral opening in each of the reservoirs. The lateral openings are on opposing sides of the housing and a tilt switch controls the direction of rotation of a reversible drive motor. One-way clutches in the transmission are provided such that each grinding mechanism is selectively rotated depending upon the direction of rotation of the motor output. The user can thus selectively dispense from one or other of the compartments by rotating the grinder through an acute angle from the upright such that the selected lateral opening faces downwardly and thus is particularly suited for use by people with limited dexterity.

21 Claims, 4 Drawing Sheets

ELECTRIC DUAL CONDIMENT GRINDER

TECHNICAL FIELD

The present invention relates to grinders for dispensing two ground condiments, such as pepper and salt, and particularly to grinders driven by electric motors

BACKGROUND OF THE INVENTION

Hand-held cordless electric grinders provide a convenient and fast method for dispensing freshly ground pepper, salt, or other condiments. A conventional grinder of this type has an elongate housing which defines a grip by which the grinder is held and which has first and second longitudinally opposing ends. A battery compartment at the first end of the housing provides power to an electric motor connected via a speed reduction geartrain to a drive shaft. The drive shaft extends through a condiment reservoir to a grinding mechanism at the second end of the housing. In an upright design the second end may be supported on a table, or a like horizontal surface, when not in use. However, a drawback of this is that, following use, the impact caused by placing the grinder upon a table tends to dislodge condiment particles from or through the grinding mechanism which drop from the grinder and, for instance, may soil a table cloth.

An inverted design is therefore preferable, in which the first end is adapted to be supported upon the table so that the second end is uppermost and a recess is provided in the housing to catch any particles dislodged following use. However, an inverted grinder of this type has ergonomic drawbacks as it is necessary to rotate the grinder approximately 180° to dispense the ground condiment and this can be troublesome for people having reduced mobility of the forearm and wrist. Moreover, operating a switch to initiate grinding at the same time as rotating the grinder in this manner can pose further difficulties to disabled people. One object of the invention is to provide a condiment grinder which addresses these drawbacks.

There is a continuing need for and interest in improvements to electric condiment grinders of this type. In particular there is a need for a grinder able to selectively dispense two freshly-ground condiments. The grinder should have an efficient geartrain with a low weight and inertia and which can be readily installed. It should also be compact with coaxial drive and driven shafts, relatively efficient and quiet in operation, while being able to operate at high motor speeds. It is a further object of the present invention to address the above needs or more generally to provide an improved condiment grinder.

DISCLOSURE OF THE INVENTION

According to one aspect of the present invention there is provided a dual condiment grinder comprising:

a hollow housing elongated to extend between a base for supporting the grinder uprightly and an opposing top, the top of the housing defining first and second condiment-receiving reservoirs;

a filling opening in each reservoir for loading condiment;

a lateral opening in each reservoir, each opening extending laterally of the housing;

an electric motor within the housing;

a battery holder within the housing, the battery holder having contacts for engaging the terminals of batteries received therein;

a switch electrically connected to the contacts for selectively supplying power to the motor;

a first and second rotary grinding mechanisms for grinding the condiment, each grinding mechanism being disposed in the lateral opening of a respective one of the reservoirs to dispense ground condiment therethrough, and drive means for transmitting torque from the motor to each grinding mechanism.

Preferably the top and the base of the housing are relatively broad and are separated by a waist portion adapted to provide a grip for holding the grinder, the base has a planar surface for supporting the grinder upright and the top has a convex surface.

Preferably a recess in the housing extends about each lateral opening, each recess having peripheral walls, each grinding mechanism being completely recessed within the housing and a lower section of each of the peripheral walls being upwardly concave to catch any condiment particles dislodged from or through the grinding mechanisms when the grinder is generally upright.

Preferably the switch is a tilt switch for automatically actuating the motor when the grinder is tilted from an upright position to direct the lateral opening downwardly.

Preferably the grinding mechanism includes a rotor and stator cooperating for grinding the condiment therebetween, the stator being fixed in the lateral opening, the rotor being mounted to a drive shaft extending through the reservoir, the transmission means includes an epicyclic geartrain driven by the motor and a bevel gear pair connected between the epicyclic geartrain and the drive shaft. Preferably the motor and epicyclic geartrain are generally disposed within the waist portion.

Preferably one bevel gear of the bevel gear pair, the epicyclic geartrain and an output shaft of the motor are coaxial with a first axis, the first axis being inclined acutely to a longitudinal axis of the waist portion and the other bevel gear of the bevel gear pair is coaxial with the drive shaft to rotate about a second axis orthogonal to the first axis.

Preferably the epicyclic geartrain includes a plurality of spur gear epicyclic gearsets, each gearset comprising planet gears meshed with a sun gear, the planet gears of each gearset supported upon a planet carrier, the gearsets stacked within a common ring gear with the sun gears coaxial, adjacent sun gears and planet carriers of adjacent gearsets being rotationally fast for transmitting torque between the adjacent gearsets.

In another aspect the invention provides a dual condiment grinder comprising:

a hollow housing elongated to extend between a base for supporting the grinder uprightly and an opposing top, the top of the housing defining first and second condiment-receiving reservoirs;

an upper opening in each reservoir for loading condiment;

a lateral opening in each reservoir, the lateral openings extending laterally from opposing sides of the housing;

a reversible electric motor within the housing;

a battery holder within the housing, the battery holder having contacts for engaging the terminals of batteries received therein;

switch means electrically connected to the contacts for supplying power to the motor to selectively drive the motor in opposing directions;

a first and second rotary grinding mechanisms for grinding the condiment, each grinding mechanism being disposed in the lateral opening of a respective one of the compartments to dispense ground condiment through the lateral opening;

first and second shafts mounted for rotation about a first transverse axis, each shaft having an outer end fixedly attached to one of the grinding mechanisms and extending inwardly through a respective reservoir, first and second bevel gears mounted for rotation about the first transverse axis;

first and second one-way clutch means, the first one-way clutch means connected between the first bevel gear and the first shaft for transmitting torque to the first grinding mechanism, the second one-way clutch means connected between the second bevel gear and the second shaft for transmitting torque to the second grinding mechanism;

a third bevel gear meshed with the first and second bevel gears, and a geartrain driven by the motor and connected in driving engagement with the third bevel gear such that rotation of the motor in one direction rotates the first grinding mechanism, while the second grinding mechanism is stationary, and rotation of the motor in a direction opposite to the one direction rotates the second grinding mechanism, while the first grinding mechanism is stationary.

Preferably each grinding mechanism includes a rotor and stator cooperating for grinding the condiment therebetween, each stator being fixed in a respective one of the lateral openings with each rotor being driven by one of the first and second shafts.

Preferably the switch means includes a double-pole, double-throw tilt switch for selectively controlling the motor direction and which is capable of detecting a change in orientation on a second transverse axis substantially orthogonal to the first transverse axis. Preferably the double-pole, double-throw tilt switch is a pendulum type centre-off switch. Optionally any other suitable tilt sensing device may be used in the tilt switch, including but not limited to one more tilt switches of the mercury type, ball type, solid state, liquid filled, or electrolytic type.

Preferably the switch means further includes a single-pole, single-throw tilt switch electrically connected in series with the double-pole, double-throw tilt switch. Preferably the single-pole, single-throw tilt switch includes a transistor operated by the single-pole, single-throw tilt switch such that the motor current substantially passes through the transistor. Preferably the double-pole, double-throw tilt switch is adapted to operate when the grinder is inclined from its upright position about the second transverse axis by a first angle and the single-pole, single-throw tilt switch is adapted to operate when the grinder is inclined from its upright position about the second transverse axis by a second angle which exceeds the first angle.

This invention provides a dual condiment grinder which is ergonomically efficient in operational use. It is particularly well-suited to use by people having reduced dexterity or mobility of the forearm and wrist, who are able to operate the grinder simply by grasping and rotating it through a small angle, typically one way to dispense salt, and the other to dispense pepper. Moreover this is achieved with a design able to catch any condiment particles dislodged from or through the grinding mechanism when the grinder is generally upright. It has a simple construction employing a number of common parts for reduced manufacturing costs. It includes modular components with a low weight and inertia, it is compact, relatively efficient and quiet in operation, and is able to operate at high motor speeds.

BRIEF DESCRIPTION OF THE DRAWINGS

Preferred forms of the present invention will now be described by way of example with reference to the accompanying drawings, wherein.

DESCRIPTION OF THE PREFERRED EMBODIMENTS

Figures 1, 2:
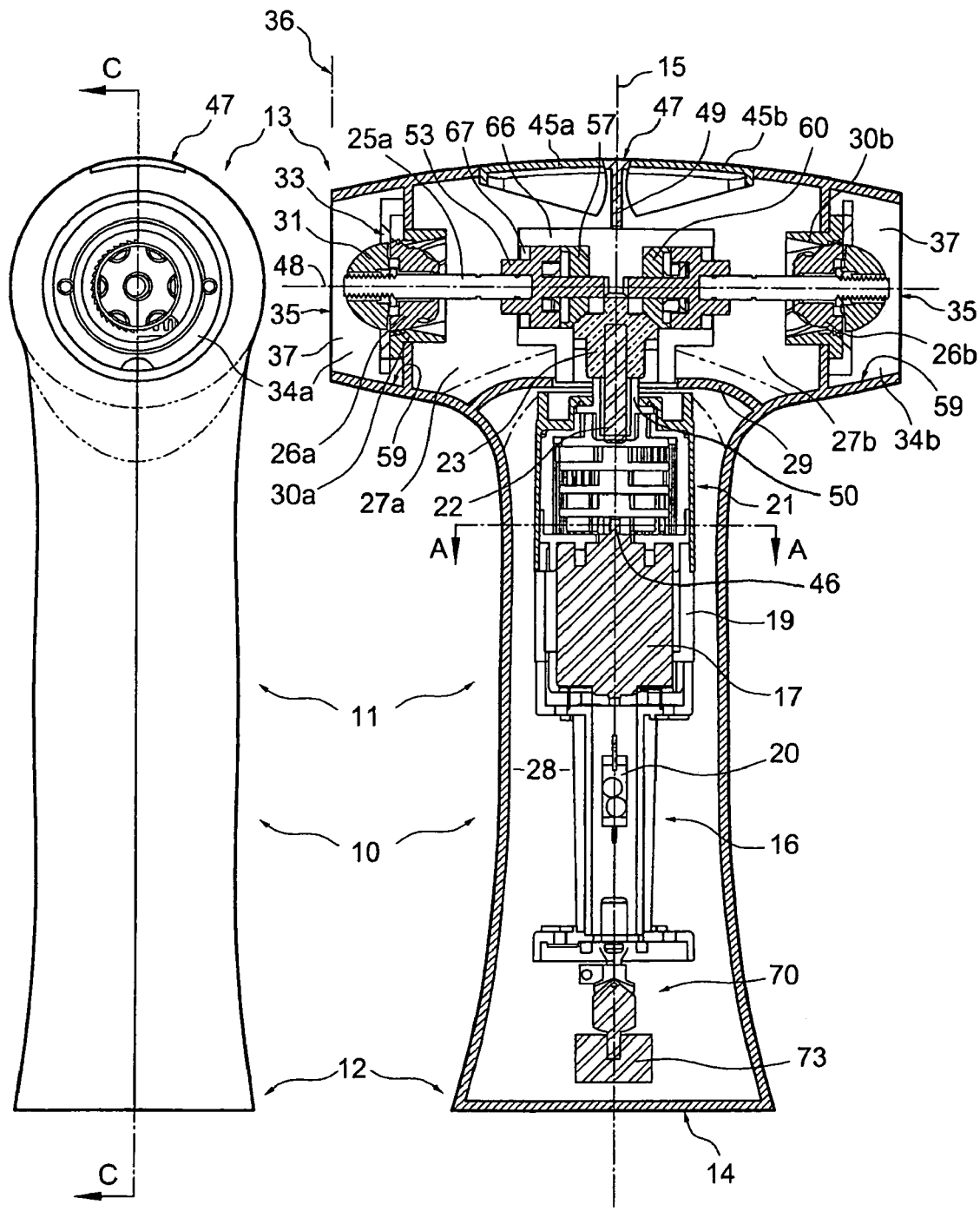
FIG. 1 is a side elevation of an exemplary embodiment of the grinder of the invention.
FIG. 2 is a schematic central longitudinal cross section along line CC of FIG. 1.
Figure 4:
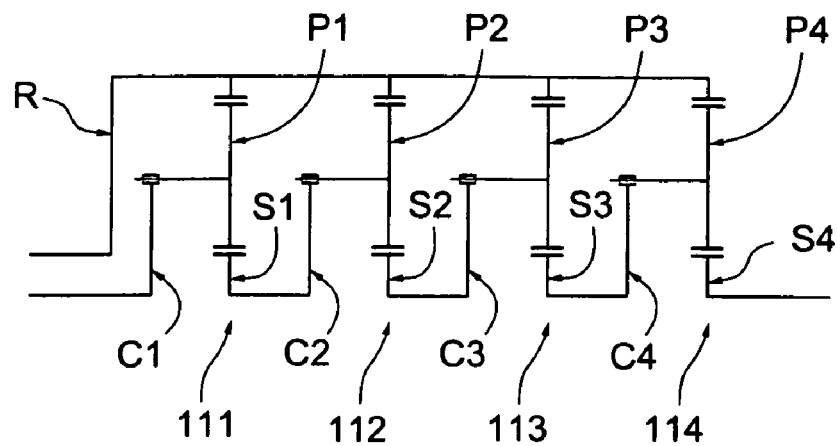
FIG. 4 is a schematic of the gear train of the grinder of FIG. 1.
Figure 3:
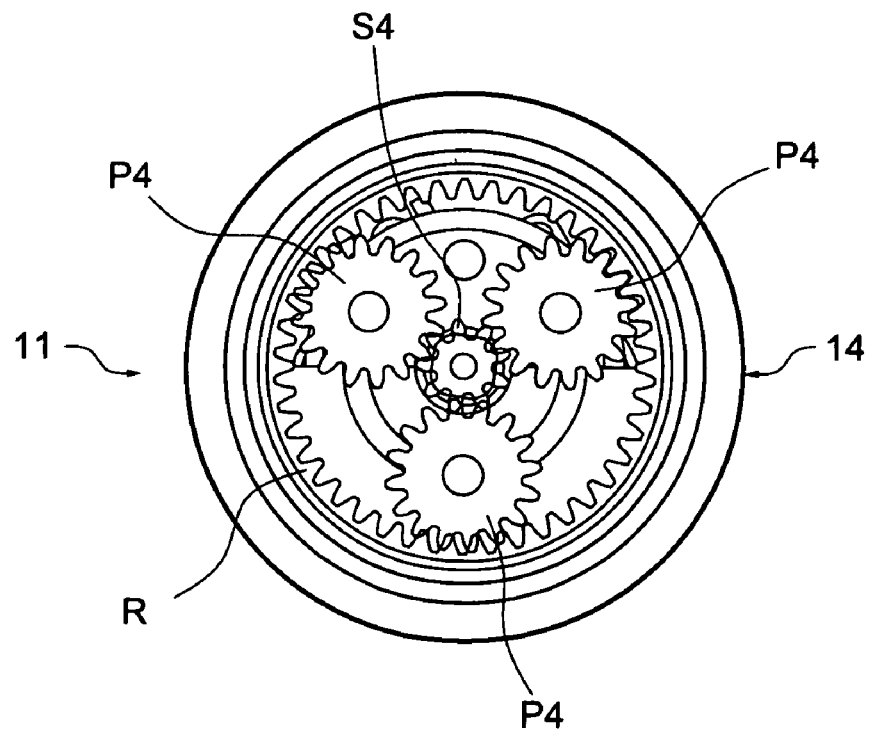
FIG. 3 is a transverse cross section along line AA of FIG. 2.
Figure 5:
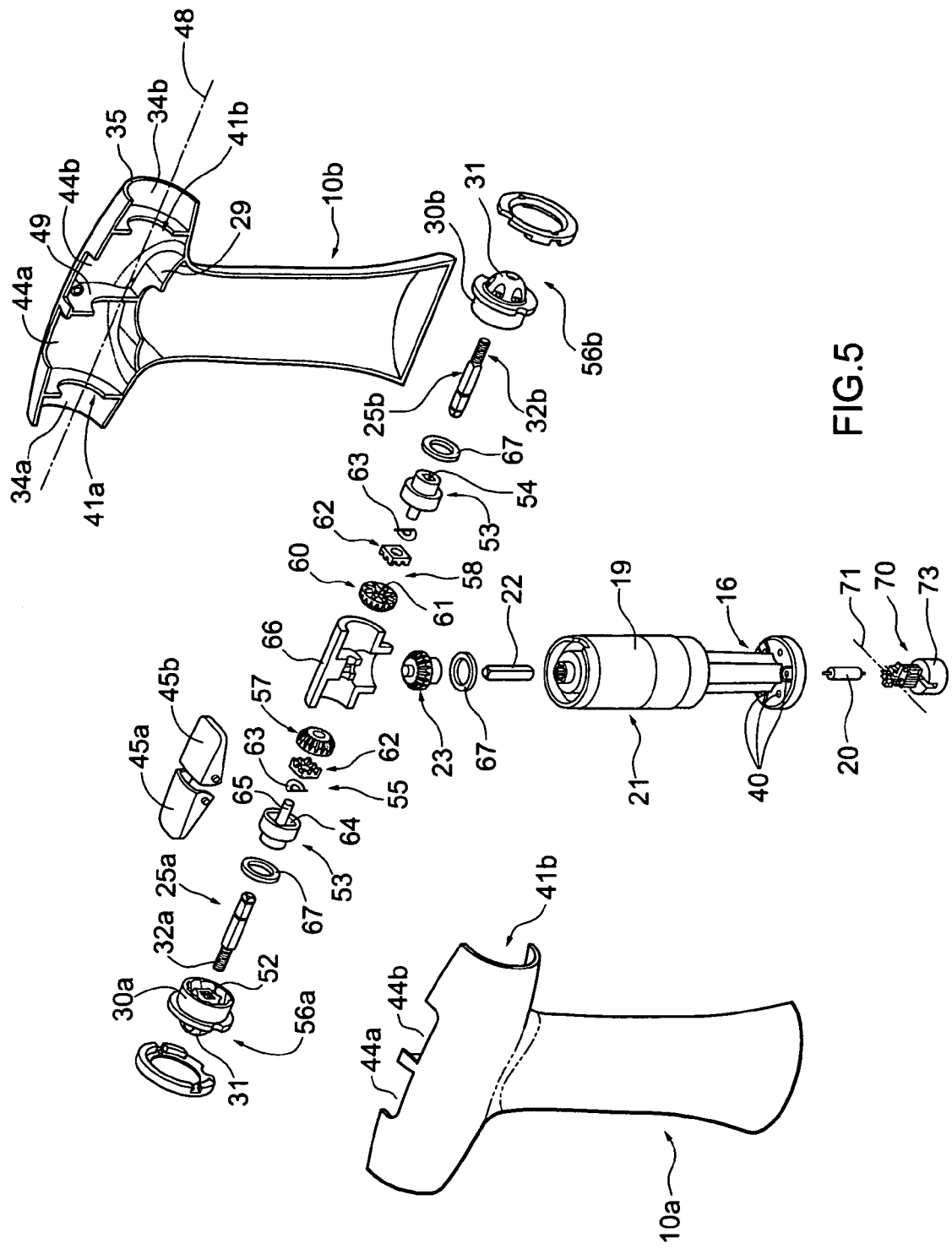
FIG. 5 is an exploded pictorial view of the grinder of FIG. 1.

Referring to FIGS. 1-5 of the drawings, a hand-held cordless electric dual condiment grinder according to an exemplary embodiment of the invention includes a hollow housing 10 having a substantially symmetrical waisted form, with an elongate waist portion 11 which provides a grip for holding the grinder. The waist portion 11 separates the base 12 from the top 13 which both have relatively broader dimensions. The base 12 has a planar face 14 for supporting the grinder upright on a horizontal surface, the face 14 extending orthogonally to a longitudinal upright axis 15 of the waist portion 11. The hollow waisted housing 10 is assembled from two T-shaped shells 10a, 10b having a bulbous top 13 with convex top surface 47 and opposing lateral openings 41a, 41b aligned with a first transverse axis 48. Disposed in the top 13 either side of the axis 15 are first and second condiment-receiving reservoirs 27a, 27b bounded externally by the housing walls and internally by the transverse wall 29 and the longitudinally extending wall 49. Upper openings 44a, 44b in the reservoirs 27a, 27b are provided for loading condiment and are closed by respective hinged closures 45a, 45b.

A battery holder 16 is provided in the housing 10 below a reversible electric motor 17 having an shaft rotating about the drive axis 15. The battery holder 16 has contacts 40 for abutting the battery terminals (not shown). The battery holder 16 and motor 17 are fixed inside a tubular mounting assembly 19, to one axial end of which the battery holder 16 is fixed. The battery holder 16 is located near the base 12, such that with batteries in place the centre of gravity is lowered for stability.

Mounted to the battery holder 16 are a ball-type tilt switch 20 and a pendulum-type double-pole, double-throw (DPDT) tilt switch 70 which are electrically connected in a circuit (see FIG. 6) between the contacts 40 and the motor 17 to control direction in which the motor output shaft is rotated, depending upon the inclination of the grinder.

An epicyclic geartrain 21 driven by the motor 17 supplies torque through a shaft 22 to a bevel gear 23. The shaft 22, bevel gear 23 and geartrain 21 are coaxial with the axis 15. The bevel gear 23 is meshed with gears 57, 60 to transmit the torque through 90° to drive shafts 25a, 25b extending through respective condiment-receiving reservoirs 27a, 27b.

The motor 17, battery holder 16 and epicyclic geartrain 21 are received in a recess 28 in the housing 10 separated from the condiment reservoir 27a, 27b by the internal wall 29.

The epicyclic geartrain 21 includes four spur gear epicyclic gearsets 111-114 mounted coaxially. Each of the gearsets 111-114 comprises planet gears P1, P2, P3, P4 meshed with a respective sun gear S1, S2, S3, S4 and supported upon a planet carrier C1, C2, C3, C4. The planet carriers C2, C3, C4 are of common construction, each integrally formed and rotationally fast with a respective one of the sun gears S1, S2, S3. The carrier C1, C2, C3, C4 includes three integral parallel, equally angularly spaced shaft portions for supporting the three planet gears P1, P2, P3, P4. The gearsets 111-114 are stacked within a non-rotating ring gear R, with which all the planet gears P1, P2, P3, P4 mesh. At the output of the geartrain 21a coupler 50 transmits torque from the carrier C1 to the shaft 22, while at the input to the geartrain the motor shaft 46 is rotationally fast with the sun gear S4.

First and second rotary grinding mechanisms 56a, 56b are of like construction, each having respective first and second stators 30a, 30b received in the opposing lateral openings 41a, 41b in the housing 10. The shafts 25a, 25b are rotationally fast with their respective grinding rotors 26a, 26b which cooperate with, and are generally received within, respective grinding stators 30a, 30b for grinding condiment therebetween. The drive shafts 25a, 25b extend through the respective reservoirs 27a, 27b and are coaxial with the first transverse axis 48. The shafts 25a, 25b have a square cross section with threaded tips 32a; 32b engaged in the threaded adjuster nuts 31, their square section outer ends received in complementary recesses 52 in respective ones of the rotors 26a, 26b, while their inner ends are received in congruent apertures 54 in couplers 53 for rotation thereof. Each grinding mechanism 56a, 56b is of a unidirectional type, which has helical teeth (not shown) and thus operates best in one direction. An adjuster nut 31 received on a threaded tip 32 of the shafts 25a, 25b engages and moves the rotors 26a, 26b axially for adjusting the size of the annular discharge opening 33 between the rotor 26a and stator 30a, and hence the fineness of the ground condiment.

The components of the grinding mechanisms, including the rotors 26a, 26b, stators 30a, 30b and adjuster nuts 31 are completely recessed within the housing 10. Ground condiment from the discharge openings 33 passes out through the respective recesses 34a, 34b in use. The recesses 34a, 34b extend about the lateral openings 41a, 41b and each have annular peripheral walls 37 and a rim 35 lying in planes 36 parallel to the upright axis 15. The lateral openings 41a, 41b extends centrally through the recesses 34a, 34b. The lower section of the walls 59 is upwardly concave to catch any condiment particles dislodged from or through the grinding mechanisms when the grinder is generally upright.

A first one-way clutch 55 provides for one-directional transmission of torque between the first grinding mechanism 56a and a first bevel gear 57, while the second one-way clutch 58 correspondingly provides for one-directional transmission of torque between the second grinding mechanism 56b and a second bevel gear 60. Both one-way clutches 55, 58 are of the ratchet type and of like construction, each including a first and second member between which torque transmission is connected and disconnected. The first member is integral with the bevel gears 57, 60 and comprises circumferentially spaced teeth 61 formed on one side axial of the bevel gears 57, 60. The second member is a pawl 62 urged by a compression spring 63 into engagement with the teeth 61 to provide unidirectional torque transmission. Each coupler 53 includes a recess 64 in which the spring 63 and pawl 62 are received, and a cylindrical stem 65 for rotatably supporting the bevel gears 57, 60 in a journal block 66. The recess 64 has a square cross section and the pawl 62 has a complementary square cross section; such that the pawl 62 is rotationally fast with the coupler 53 but can move axially in the recess 64. Rings 67 retain the one-way clutches 55, 58 within the journal block 66.

The third bevel gear 23 is mounted in mesh with the first and second bevel gears 57, 60 in the journal block 66. The bevel gear 23 is driven by the motor 17, through the geartrain 21 and shaft 22. So that the motor 17 is selectively operated (in forward or reverse) depending upon which of the recesses 34a, 34b are generally opening downward, the DPDT tilt switch 70 is configured for detecting a change in orientation on a second transverse axis 71 substantially orthogonal to the first transverse axis 48 and includes a pendulum 73 mounted to swing about the second transverse axis 71.

Figure 6:
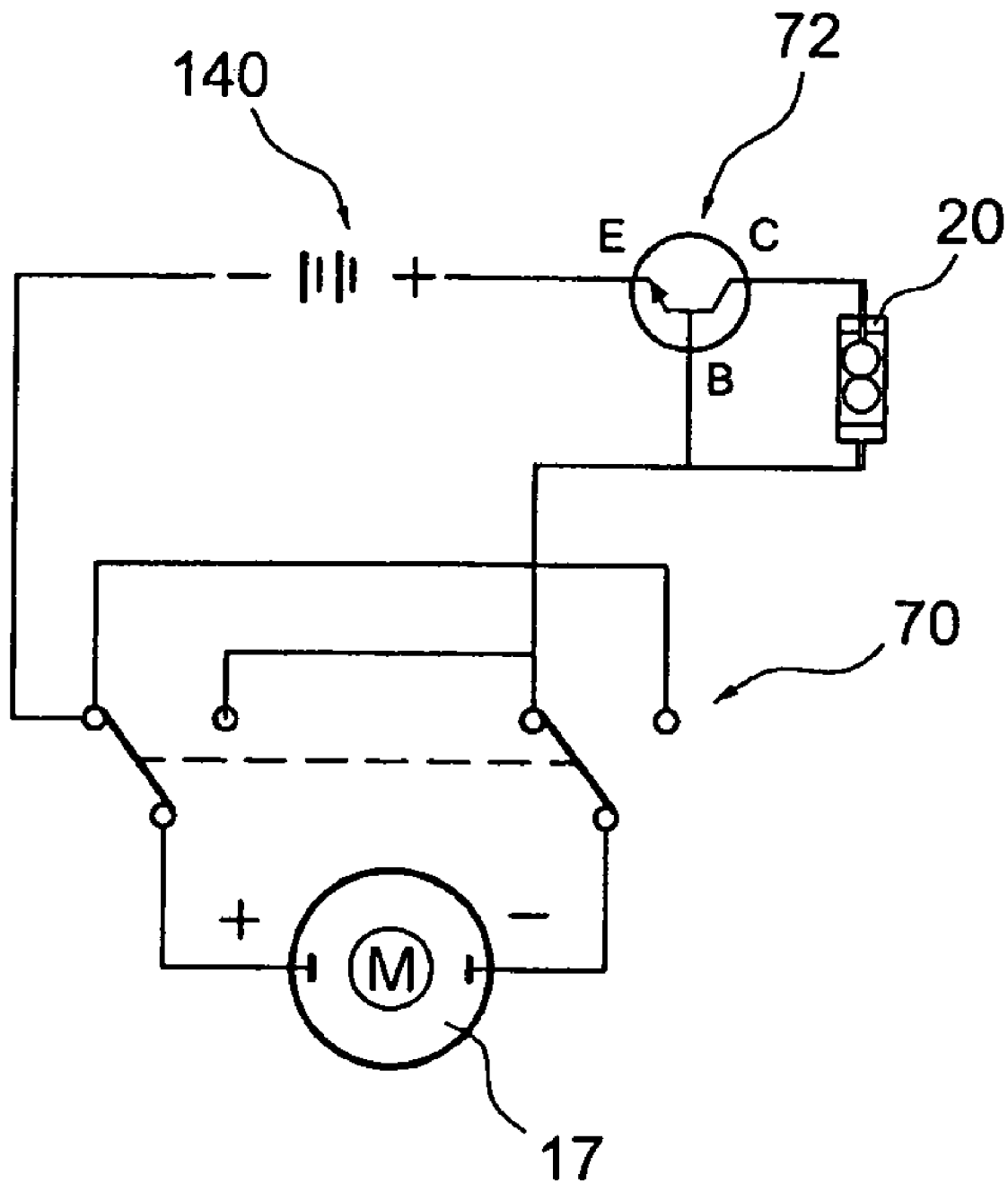
FIG. 6 is a schematic electrical circuit drawing of the grinder of FIG. 1.

FIG. 6 illustrates the circuit for supplying current from the batteries 140 to the motor 17 (shown in an operating state). A bipolar junction transistor 72 is connected in the circuit for switching the current to the motor 17, the emitter E and base B of the transistor 72 being connected between the battery 140 and the DPDT tilt switch 70. The ball-type tilt switch 20 is connected between the base B and collector C of transistor 72. In this configuration the pendulum-type DPDT tilt switch 70 has a centre-off position (not shown) and is operated when the grinder is inclined about the axis 71 (see FIG. 5) to either side of its upright position by a first angle (for instance, 25-35°) thereby creating a voltage across the ball-type tilt switch 20. As this first angle is increased (for instance, to 40-50°) the ball-type tilt switch 20 is operated to switch the transistor on and thus supply current to the motor.

In use, pepper may be placed in reservoir 27a, and salt crystals in reservoir 27b. Grasping the waist portion 11 and tilting the grinder about 40°-50° from its upright position about the axis 71 to incline the recess 34a downwardly causes the motor 17 to be actuated by operation of the tilt switches 70, 20 and torque is transmitted through the one-way clutch 55 to the grinding mechanism 56a, to grind and dispense pepper from the reservoir 27a. As no torque is transmitted by the one-way clutch 58, the grinding mechanism 56b is stationary. The tilt switches 70, 20 open when the grinder is supported upright when not in use and correspondingly, when tilting the grinder in the opposite direction through about 40°-50° from its upright position about the axis 71 torque is transmitted through the one-way clutch 58 to the grinding mechanism 56b to grind and dispense salt from the reservoir 27b and no torque is transmitted by the one-way clutch 55 to grinding mechanism 56a which is stationary.

Aspects of the present invention have been described by way of example only and it should be appreciated that modifications and additions may be made thereto without departing from the scope thereof.

What is claimed is:

1. A dual condiment grinder comprising:
   a hollow housing elongated to extend between a base for supporting the grinder uprightly and an opposing top, the top of the housing defining first and second condiment-receiving reservoirs;
   a filling opening in each reservoir for loading condiment;
   a lateral opening in each reservoir, each opening extending laterally of the housing;
   an electric motor within the housing;
   a battery holder within the housing, the battery holder having contacts for engaging the terminals of batteries received therein;

a switch electrically connected to the contacts for selectively supplying power to the motor;

a first and second rotary grinding mechanisms for grinding the condiment, each grinding mechanism being disposed in the lateral opening of a respective one of the reservoirs to dispense ground condiment therethrough, and drive means for transmitting torque from the motor to each grinding mechanism.

2. The grinder of claim 1 wherein the top and the base of the housing are relatively broad and are separated by a waist portion adapted to provide a grip for holding the grinder, the base has a planar surface for supporting the grinder upright and the top has a convex surface.

3. The grinder of claim 2 wherein a recess in the housing extends about each lateral opening, each recess having peripheral walls, each grinding mechanism being completely recessed within the housing and a lower section of each of the peripheral walls being upwardly concave to catch any condiment particles dislodged from or through the grinding mechanisms when the grinder is generally upright.

4. The grinder of claim 1 wherein the switch is a tilt switch for automatically actuating the motor when the grinder is tilted from an upright position to direct the lateral opening downwardly.

5. The grinder of claim 3 wherein each grinding mechanism includes a rotor and stator cooperating for grinding the condiment therebetween, each stator is fixed in a respective one of the lateral openings, each rotor is mounted to a drive shaft extending through the respective reservoir, and the drive means includes an epicyclic geartrain driven by the motor and a bevel gear pair connected between the epicyclic geartrain and the drive shaft.

6. The grinder of claim 5 wherein the motor and epicyclic geartrain are generally disposed within the waist portion.

7. The grinder of claim 5 wherein one bevel gear of the bevel gear pair, the epicyclic geartrain and an output shaft of the motor are coaxial with a first axis, and the other bevel gear of the bevel gear pair is coaxial with the drive shaft to rotate about a second axis orthogonal to the first axis.

8. The grinder of claim 5 wherein the epicyclic geartrain includes a plurality of spur gear epicyclic gearsets, each gearset comprising planet gears meshed with a sun gear, the planet gears of each gearset supported upon a planet carrier, the gearsets stacked within a common ring gear with the sun gears coaxial, adjacent sun gears and planet carriers of adjacent gearsets being rotationally fast for transmitting torque between the adjacent gearsets.

9. A dual condiment grinder comprising:
a hollow housing elongated to extend between a base for supporting the grinder uprightly and an opposing top, the top of the housing defining first and second condiment-receiving reservoirs;

an upper opening in each reservoir for loading condiment;

a lateral opening in each reservoir, the lateral openings extending laterally from opposing sides of the housing;

a reversible electric motor within the housing;

a battery holder within the housing, the battery holder having contacts for engaging the terminals of batteries received therein;

switch means electrically connected to the contacts for supplying power to the motor to selectively drive the motor in opposing directions;

a first and second rotary grinding mechanisms for grinding the condiment, each grinding mechanism being disposed in the lateral opening of a respective one of the compartments to dispense ground condiment through the lateral opening;

first and second shafts mounted for rotation about a first transverse axis, each shaft having an outer end fixedly attached to one of the grinding mechanisms and extending inwardly through a respective reservoir, first and second bevel gears mounted for rotation about the first transverse axis;

first and second one-way clutch means, the first one-way clutch means connected between the first bevel gear and the first shaft for transmitting torque to the first grinding mechanism, the second one-way clutch means connected between the second bevel gear and the second shaft for transmitting torque to the second grinding mechanism;

a third bevel gear meshed with the first and second bevel gears, and a geartrain driven by the motor and connected in driving engagement with the third bevel gear such that rotation of the motor in one direction rotates the first grinding mechanism, while the second grinding mechanism is stationary, and rotation of the motor in a direction opposite to the one direction rotates the second grinding mechanism, while the first grinding mechanism is stationary.

10. The grinder of claim 9 wherein the top and the base of the housing are relatively broad and are separated by a waist portion adapted to provide a grip for holding the grinder, the base has a planar surface for supporting the grinder upright and the top has a convex surface.

11. The grinder of claim 10 wherein a recess in the housing extends about each lateral opening, each recess having peripheral walls, each grinding mechanism being completely recessed within the housing and a lower section of each of the peripheral walls being upwardly concave to catch any condiment particles dislodged from or through the grinding mechanisms when the grinder is generally upright.

12. The grinder of claim 10 wherein each grinding mechanism includes a rotor and stator cooperating for grinding the condiment therebetween, each stator is fixed in a respective one of the lateral openings, each rotor is mounted to a drive shaft extending through the respective reservoir, and the gear train comprises an epicyclic geartrain.

13. The grinder of claim 12 wherein the motor and epicyclic geartrain are generally disposed within the waist portion.

14. The grinder of claim 12 wherein the epicyclic geartrain and an output shaft of the motor are coaxial with a first axis, and the first and second bevel gears are coaxial with the drive shaft to rotate about a second axis orthogonal to the first axis.

15. The grinder of claim 12 wherein the epicyclic geartrain includes a plurality of spur gear epicyclic gearsets, each gearset comprising planet gears meshed with a sun gear, the planet gears of each gearset supported upon a planet carrier, the gearsets stacked within a common ring gear with the sun gears coaxial, adjacent sun gears and planet carriers of adjacent gearsets being rotationally fast for transmitting torque between the adjacent gearsets.

16. The grinder of claim 9 wherein the switch means is a tilt switch for automatically actuating the motor when the grinder is tilted from an upright position to direct the lateral opening downwardly.

17. The grinder of claim 16 wherein the switch means includes a double-pole, double-throw tilt switch for selectively controlling the motor direction and which is capable of detecting a change in orientation on a second transverse axis substantially orthogonal to the first transverse axis.

18. The grinder of claim 17 wherein the double-pole, double-throw tilt switch is a pendulum type centre-off switch.

19. The grinder of claim 16 wherein the switch means further includes a single-pole, single-throw tilt switch electrically connected in series with the double-pole, double-throw tilt switch.

20. The grinder of claim 19 wherein the single-pole, single-throw tilt switch includes a transistor operated by the single-pole, single-throw tilt switch such that the motor current substantially passes through the transistor.

21. The grinder of claim 20 wherein the double-pole, double-throw tilt switch is adapted to operate when the grinder is inclined from its upright position about the second transverse axis by a first angle and the single-pole, single-throw tilt switch is adapted to operate when the grinder is inclined from its upright position about the second transverse axis by a second angle which exceeds the first angle.

* * * * *